(12) United States Patent
Yilmaz et al.

(10) Patent No.: US 10,813,018 B2
(45) Date of Patent: Oct. 20, 2020

(54) SECONDARY NODE CHANGE SIGNALING IN FUTURE RADIO NETWORKS

(71) Applicant: Telefonaktiebolaget LM Ericsson (publ), Stockholm (SE)

(72) Inventors: Osman Nuri Can Yilmaz, Espoo (FI); Riikka Susitaival, Helsinki (FI); Alexander Vesely, Feldbach (AT); Stefan Wager, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/346,903

(22) PCT Filed: Nov. 3, 2017

(86) PCT No.: PCT/EP2017/078181
§ 371 (c)(1),
(2) Date: May 2, 2019

(87) PCT Pub. No.: WO2018/083236
PCT Pub. Date: May 11, 2018

(65) Prior Publication Data
US 2020/0059833 A1 Feb. 20, 2020

Related U.S. Application Data

(60) Provisional application No. 62/417,724, filed on Nov. 4, 2016.

(51) Int. Cl.
*H04W 36/32* (2009.01)
*H04W 36/00* (2009.01)
*H04W 76/27* (2018.01)

(52) U.S. Cl.
CPC ... *H04W 36/0094* (2013.01); *H04W 36/0027* (2013.01); *H04W 36/0033* (2013.01); *H04W 36/0069* (2018.08); *H04W 36/0072* (2013.01); *H04W 36/32* (2013.01); *H04W 76/27* (2018.02)

(58) Field of Classification Search
CPC .................................................. H04W 36/0033
(Continued)

(56) References Cited

U.S. PATENT DOCUMENTS

2010/0115275 A1* 5/2010 Suh ...................... H04W 12/08
713/168
2012/0142354 A1* 6/2012 Ahluwalia ........ H04W 36/0072
455/436

(Continued)

OTHER PUBLICATIONS

CATT, "Consideration on CP Procedures for LTE and NR Interworking", 3GP TSG RAN WG3 Meeting #93bis, Sophia Antipolis, France, Oct. 10, 2016, pp. 1-5, R3-162215, 3GPP.
(Continued)

*Primary Examiner* — Joel Ajayi
(74) *Attorney, Agent, or Firm* — Coats & Bennett, PLLC

(57) ABSTRACT

The invention refers to a transfer of a User Equipment context from a source secondary network node (110A) to a target secondary network node (110B) that is different than the source secondary network node, wherein the UE (105) is served by a master network node (120) and the source secondary network node (110A), the source secondary network node (110A): transmitting a first message to the target secondary network node (110B), the first message comprising a handover request, receiving a second message comprising configuration data of the target secondary network, and after receiving the second message, transmitting to the master network node a third message comprising the configuration data of the target secondary network node; the invention further referring to a master network node (120): receiving a first message from the source secondary network node, the first message comprising a request to initiate a transfer of the UE context from the source secondary network node to the target secondary network node, in response to the request, transmitting a second message to the
(Continued)

target secondary network node, and receiving a third message from the target secondary network node, the third message comprising configuration data of the target secondary network node.

20 Claims, 11 Drawing Sheets

(58) Field of Classification Search
USPC .......................................................... 455/438
See application file for complete search history.

(56) References Cited

U.S. PATENT DOCUMENTS

2014/0094212 A1* 4/2014 Ahn ..................... H04W 4/70
455/517
2016/0205578 A1* 7/2016 Lee ..................... H04W 24/10

OTHER PUBLICATIONS

Interdigital Communications, "UE Transmissions in New State for NR", 3GPP TSG-RAN WG2 #95bis, Kaohsiung, Taiwan, Oct. 10, 2016, pp. 1-4, R2-166870, 3GPP.

Ericsson, "Further Stage 2 Topics for Option 3", 3GPP TSG-RAN WG3 Meeting #96, Hangzou, P.R. China, May 15, 2017, pp. 1-5, R3-171720, 3GPP.

Ericsson, "Procedure for Secondary Node Change", 3GPP TSG-RAN WG2 #97, Athens, Greece, Feb. 13, 2017, pp. 1-4, Tdoc R2-1700920, 3GPP.

NEC, "Intra NR Mobility (Inter gNBs Mobility)", 3GPP TSG RAN WG3 Meeting #93, Göteborg, Sweden, Aug. 22, 2016, pp. 1-5, R3-161705, 3GPP.

Ericsson, "RRM and Related Control Plane Aspects for LTE-NR Tight-Interworking", Oct. 10, 2016, Kaohsiung, Taiwan, Oct. 10, 2016, pp. 1-4, Tdoc R2-166777, 3GPP.

NTT Docomo, "New SID Proposal: Study on New Radio Access Technology", 3GPP TSG RAN Meeting #71, Göteborg, Sweden, Mar. 7, 2016, pp. 1-8, RP-160671, 3GPP.

3rd Generation Partnership Project, "3rd Generation Partnership Project; Technical Specification Group Radio Access Network; Study on Scenarios and Requirements for Next Generation Access Technologies; (Release 14)", Technical Report, 3GPP TR 38.913 V14.0.0, Oct. 1, 2016, pp. 1-39, 3GPP.

3rd Generation Partnership Project, "3rd Generation Partnership Project; Technical Specification Group Services and System Aspects; Study on Architecture for Next Generation System (Release 14)", Technical Report, 3GPP TR 23.799 V1.1.0, Oct. 1, 2016, pp. 1-501, 3GPP.

* cited by examiner

SECONDARY NODE CHANGE SIGNALING IN FUTURE RADIO NETWORKS

TECHNICAL FIELD

Disclosed herein are embodiments for handling a transfer of a User Equipment, UE, context within a secondary network from a source secondary network node to a target secondary network node; especially a transfer is considered for Long Term Evolution—New Radio interworking.

BACKGROUND

The Third Generation Partnership Project (3GPP) has started work on the development and design of the next generation mobile communications system (a.k.a., the 5G mobile communication system or simply "5G" for short). 5G will encompass an evolution of today's 4G networks and the addition of a new, globally standardized radio access technology known as "New Radio" (NR).

The large variety of requirements for NR implies that frequency bands at many different carrier frequencies will be needed. For example, low bands will be needed to achieve sufficient coverage and higher bands (e.g. Millimeter Wave, mmW, such as near and above 30 GHz) will be needed to reach the required capacity. At high frequencies, the propagation properties are more challenging and high order beamforming at the base station (e.g., evolved NodeB, eNB, or NR NodeB, gNB) will be required to reach sufficient link budget. For example, narrow beam transmission and reception schemes may be needed at higher frequencies to compensate the high propagation loss. For a given communication link, a beam can be applied at the transmission point (TRP) (i.e., a transmit (TX) beam) and a beam can be applied at the user equipment (UE) (i.e., a receive (RX) beam)), which collectively is referred to as a "beam pair link" (BPL) or just "link" for short.

NR will have a beam centric design, which means that the traditional cell concept is relaxed and user equipments (UEs) (fixed or mobile wireless communication devices) will in many cases be connected to and perform "handover" between narrow beams instead of cells. Hence, 3GPP has agreed to study concepts for handling mobility between beams (both within and between transmission points (TRPs)). In the following, such mobility will also be referred to as beam based mobility; the potentially high number of mobility beams will make handover much more complex that of LTE; e.g. it may be unfeasible for the UE to perform power measurement of all possible beams; instead of this there may be a preselection in the network of best suitable beams to be measured by the UE.

Overall requirements for the Next Generation (NG) architecture (see TR 23.799, Study on Architecture for Next Generation, which is incorporated herein by reference in its entirety) and, more specifically the NG Access Technology (see TR 38.913, Study on Scenarios and Requirements for Next Generation Access Technologies, which is incorporated herein by reference in its entirety) may impact the design of 5G (see RP-160671, New SID Proposal: Study on New Radio Access Technology, DoCoMo, which is incorporated herein by reference in its entirety) from mobility to control plane design and mechanisms.

SUMMARY

It is an object to design basic radio resource management (RRM) functions, such as mobility handling among Long Term Evolution (LTE) (e.g. Evolved Node B (eNB)), NR Radio nodes (e.g. gNB) entities, and user equipments.

This object is achieved by the independent claims. Advantageous embodiments are described in the dependent claims and by the following description.

Embodiments relate to the secondary node change and the reconfiguration of a new secondary node where the RRC protocol(s) of the source secondary node and/or target secondary node are partially in charge of the secondary node change. Advantages of the proposed embodiments may include minimization of the specification of NR related mobility measurement configurations and procedures in LTE specifications and vice versa by distributing mobility management/control between MeNB and SgNB or MgNB and SeNB in case of LTE-NR interworking. An additional benefit is the LTE eNB does not need to implement NR related mobility procedures and algorithms.

According to one aspect a method performed by a source secondary network node to transfer a User Equipment context from the source secondary network node to a target secondary network node that is different than the source secondary network node is provided. The method comprises: transmitting, by the source secondary network node, a first message to the target secondary network node, wherein the target network node is configured to respond to the first message by transmitting to the source secondary network node a second message comprising configuration data of the target secondary network node; receiving, at the source secondary network node, the second message transmitted by the target secondary network node; and after receiving the second message, initiating a transfer of the UE context from the source secondary network node to the target secondary network node, wherein initiating the transfer of the UE context comprises transmitting, by the source secondary network node, to a master network node a third message comprising the configuration data of the target secondary network node.

In some embodiments, the first message comprises a Handover Request message, the Handover Request message instructing the target secondary network node to perform one or more configuration actions.

In some embodiments, the second message comprises a Handover Response message.

In some embodiments, the configuration data comprises one of: a radio resource control (RRC) protocol data unit (PDU) or an information element.

In some embodiments, the method further comprises receiving, at the source secondary network node, a fourth message transmitted by the master network node, the fourth message comprising a Release Request, wherein the master network node is configured to transmit the fourth message after receiving the third message.

In some embodiments, the source secondary network node comprises a first New Radio Node, the target secondary network node comprises a second New Radio Node, and the master network node comprises an Evolved Node B.

In some embodiments, the source secondary network node comprises a first Evolved Node B, the target secondary network node comprises a second Evolved Node B, and the master network node comprises a New Radio Node.

In another aspect, a source secondary network node is provided, the source secondary network node comprising a transmitter, a receiver, a memory, and a data processing system comprising one or more processors, wherein the source secondary network node is configured to perform the methods described above.

In yet another aspect, a method performed by a master network node to transfer a User Equipment context from a source secondary network node to a target secondary network node that is different than the source secondary network node is provided. The method comprises: receiving, at the master network node, a first message transmitted by the source secondary network node, the first message comprising a request to initiate a transfer of the UE context from the source secondary network node to the target secondary network node; in response to the request, transmitting, by the master network node, a second message to the target secondary network node; and receiving, by the master network node, a third message from the target secondary network node, the third message comprising configuration data of the target secondary network node.

In some embodiments, the method further comprises transmitting, by the master network node, a fourth message to the source secondary network node, the fourth message comprising an acknowledgement of the request. In some embodiments, the method further comprises transmitting, by the master network node, a fifth message to the source secondary network node, the fifth message comprising a Release Request.

In some embodiments, the method further comprises: in response to receiving the third message, transmitting a sixth message to the User Equipment, the sixth message comprising a RRCConnectionReconfiguration message; and receiving a seventh message from the User Equipment, the seventh message comprising a RRCConnectionReconfiguration Complete. In some embodiments, in response to receiving the seventh message, the master network node transmits, to the target secondary network node, an eighth message, the eighth message comprising a Reconfiguration Complete.

In some embodiments, the first message comprises a Change Request.

In some embodiments, the configuration data of the target secondary network node comprises one of: a radio resource control (RRC) protocol data unit (PDU) or an information element.

In some embodiments, the source secondary network node comprises a first New Radio Node, the target secondary network node comprises a second New Radio Node, and the master network node comprises an Evolved Node B.

In some embodiments, the source secondary network node comprises a first Evolved Node B, the target secondary network node comprises a second Evolved Node B, and the master network node comprises a New Radio Node.

In yet another aspect, a master network node is provided, the master network node comprising a transmitter, a receiver, a memory, and a data processing system comprising one or more processors, wherein the master network node is configured to perform the foregoing methods.

BRIEF DESCRIPTION OF THE DRAWINGS

Further details of embodiments are described with reference to the drawings, wherein.

DETAILED DESCRIPTION

Figure 1:
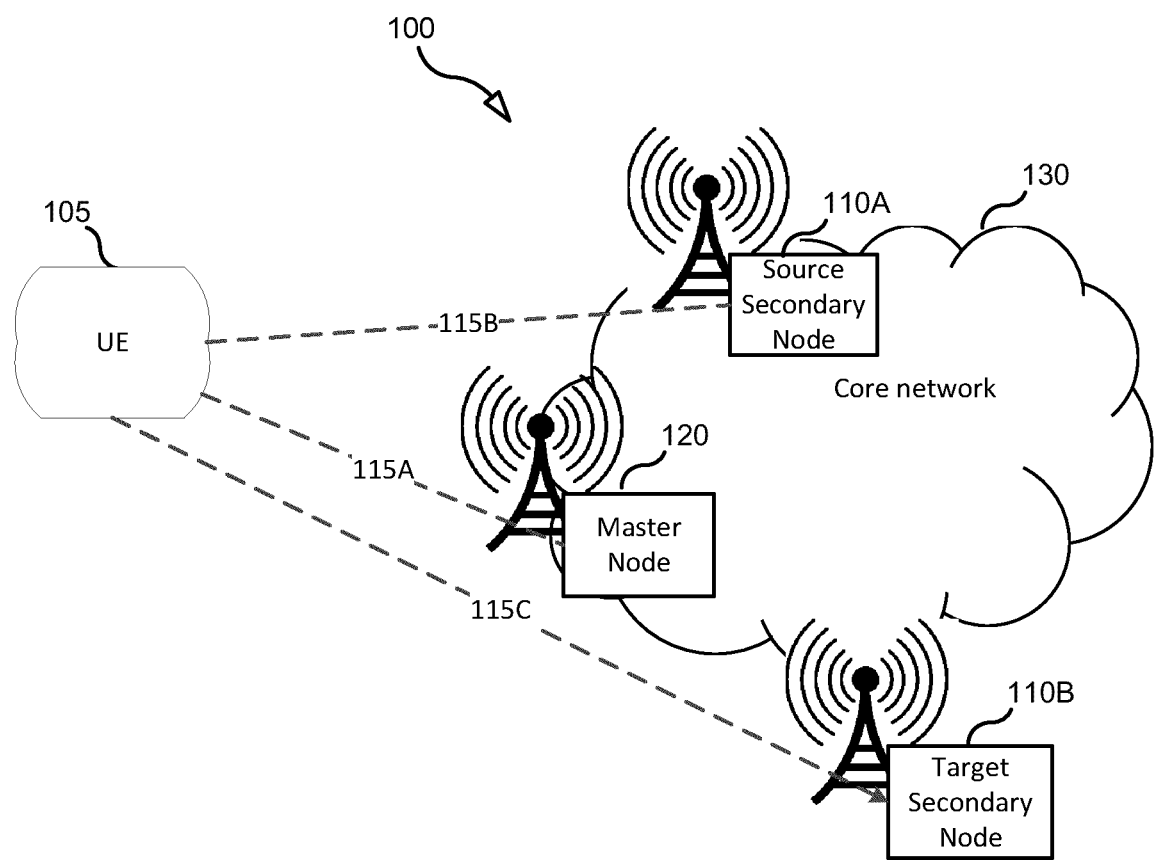
FIG. 1 illustrates an exemplary wireless communications system according to some embodiments.

FIG. 1 illustrates an exemplary wireless communications system according to some embodiments. Wireless communications system 100 may comprise a User Equipment 105 (i.e., fixed or mobile wireless communication device) and one or more base stations, including a master radio resource control (RRC) network node 120, and a plurality of secondary RRC network nodes 110A-B. In some embodiments, the master network node 120 and the secondary network nodes 110A-B are further in communication with a core network 130. In some embodiments, the master network node 120 may comprise a master Evolved Node B as known in LTE networks (referred to herein as MeNB), and the secondary network nodes 110A-B may comprise secondary New Radio (NR) RRC entities for the next generation/5G access technologies (referred to herein as SgNB). In other embodiments, the master network node 120 may comprise a master NR network node (referred to herein as MgNB) and the secondary network nodes 110A-B may comprise secondary eNBs (referred to herein as SeNB).

In some embodiments, the master network node 120 may serve the UE 105 as indicated by link 115A. In some embodiments, a secondary network node 110A-B may further provide additional resources for the UE 105, such as serving cells. For example, a secondary network node 110A-B may provide additional resources based on a received measurement report, traffic conditions, or bearer types. Thus, in some embodiments, UE 105 may be served by both a master network node 120 and a source secondary network node 110A, as illustrated by links 115A and 115B. However, in some embodiments, it may be desirable to switch from the source secondary network node 110A to a target secondary network node 110B, in which case the UE may be served by both the master network node 120 and the target secondary network node 110B after a secondary network node transfer, as illustrated by links 115A and 115C.

LTE Dual Connectivity

In LTE Dual Connectivity (DC), thanks to the mutual intelligibility between master and secondary network nodes (MeNB 120 and SeNB 110A), the MeNB 120 is able to maintain the RRM measurement configuration of the UE 105 for mobility procedures. Furthermore, the MeNB 120 may decide to ask a SeNB 110A to provide additional resources (serving cells) for a UE 105 e.g., based on the received measurement reports or traffic conditions or bearer types as it is straightforward the interpret those by the RRC entity located at the master network node 120. Therefore, the mobility can mainly be coordinated by the MeNB 120 in case of LTE DC.

Figure 2:
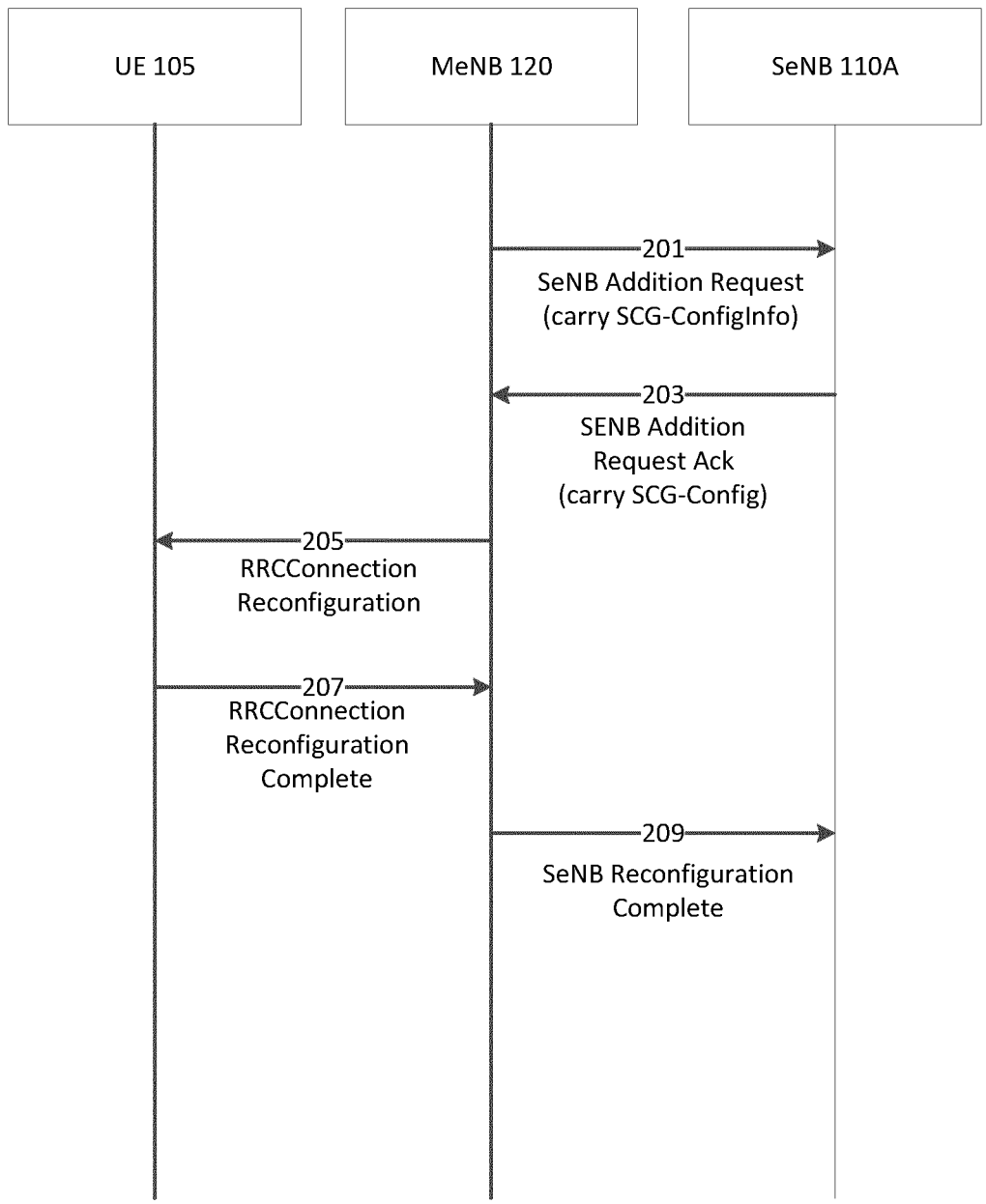
FIG. 2 illustrates a prior art signaling diagram.

FIGS. 2-5 are prior art signaling diagrams for LTE DC based on 3GPP TS 36.300, which is incorporated by reference herein in its entirety. As illustrated in FIG. 2, the SeNB Addition procedure for LTE DC is initiated by the MeNB 120 and is used to establish a UE context at the SeNB 110A in order to provide radio resources from the SeNB 110A to the UE 105. This procedure is used to add at least the first cell, i.e., PSCell of the Secondary Cell Group (SCG) in case of LTE DC. As shown in FIG. 2, the MeNB 120 may transmit a first message 201, which is a SeNB Request (carry SCG-ConfigInfo) message. The SCG-ConfigInfo may include the MeNB 120 configuration and the entire UE 105 capabilities for UE capability coordination to be used as a basis for the reconfiguration by the SeNB. Next, the SeNB 110A may transmit a second message 203, which is a SeNB Addition Request Acknowledge (Carry SCG-Config) message. The SCG-Config may include the new radio resource of SCG, including radio configuration information and data forwarding address information (if applicable). Next, to perform the handover, the MeNB 120 may transmit a third message 205 to the UE 105, which is a RRCConnection-Reconfiguration message. Next, the UE 105 may transmit a fourth message 207 back to the MeNB 120, the fourth message comprising a RRCConnectionReconfiguration-Complete message. Finally, the MeNB 120 may transmit a fifth message 209 to the SeNB 110A comprising a Reconfiguration Complete message.

Figure 3:
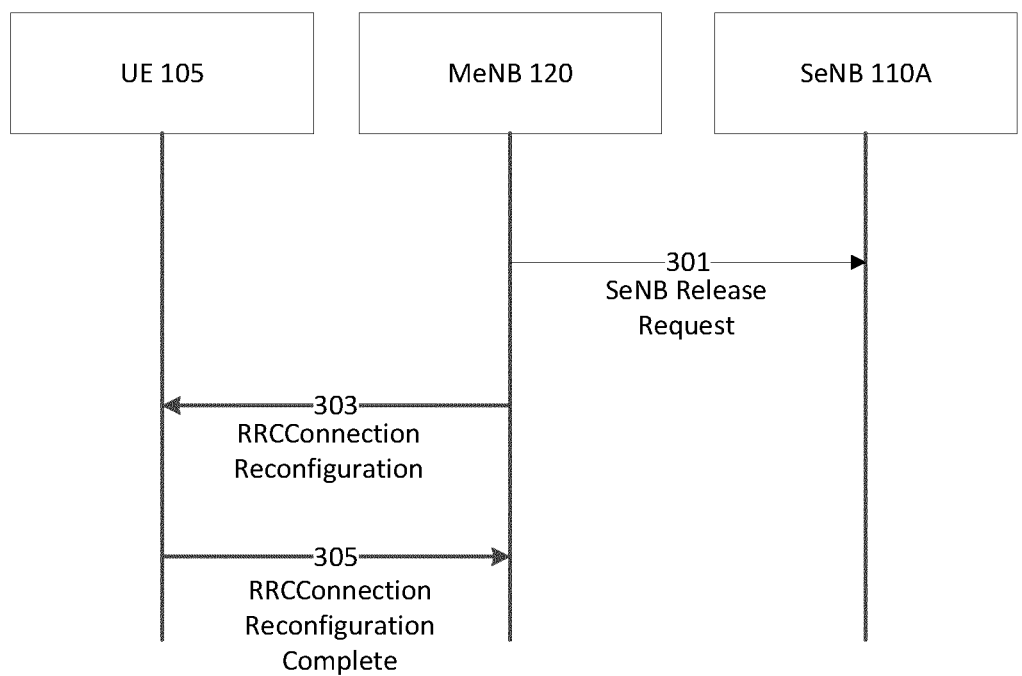
FIG. 3 illustrates a prior art signaling diagram.
Figure 4:
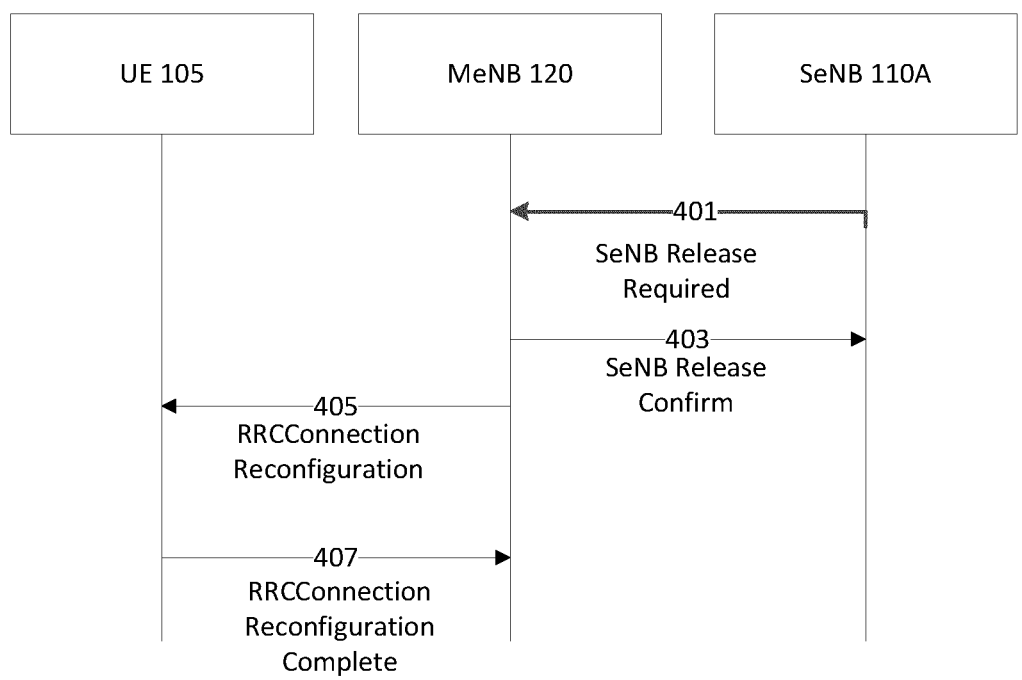
FIG. 4 illustrates a prior art signaling diagram.

FIGS. 3-4 illustrate a SeNB 110A release procedure for LTE DC. The SeNB Release procedure may be initiated either by the MeNB 120 or the SeNB 110A and is used to initiate the release of the UE context at the SeNB. The recipient node of this request cannot reject. The SeNB Release procedure does not necessarily need to involve signaling towards the UE, e.g., RRC reconnection re-establishment due to Radio Link Failure in MeNB 120. FIG. 3 illustrates a release procedure initiated by the MeNB 120, and FIG. 4 illustrates a release procedure initiated by the SeNB 110A. As shown in FIG. 3, the MeNB 120 initiates the release procedure of the SeNB 110A by transmitting a first message 301 to the SeNB 110A, the first message being a SeNB Release Request. The SeNB Release Request may trigger the source SeNB 110A to stop providing user data to the UE 105, and if applicable, to start data forwarding. The MeNB 120 then transmits message 303 to the UE 105 comprising a RRC ConnectionReconfiguration, and the UE responds and transmits message 305 to the MeNB 120 confirming RRCConnectionReconfiguration Complete. As shown in FIG. 4, the SeNB 110A initiates the release procedure by transmitting a first message 401 to the MeNB 120 comprising a SeNB Release Required. The MeNB 120 then transmits message 403 to the SeNB 110A comprising a SeNB Release Confirm. The MeNB 120 then transmits message 405 to the UE 105 comprising a RRC Connection-Reconfiguration, and the UE responds and transmits message 407 to the MeNB 120 confirming RRCConnectionReconfiguration Complete.

Figure 5:
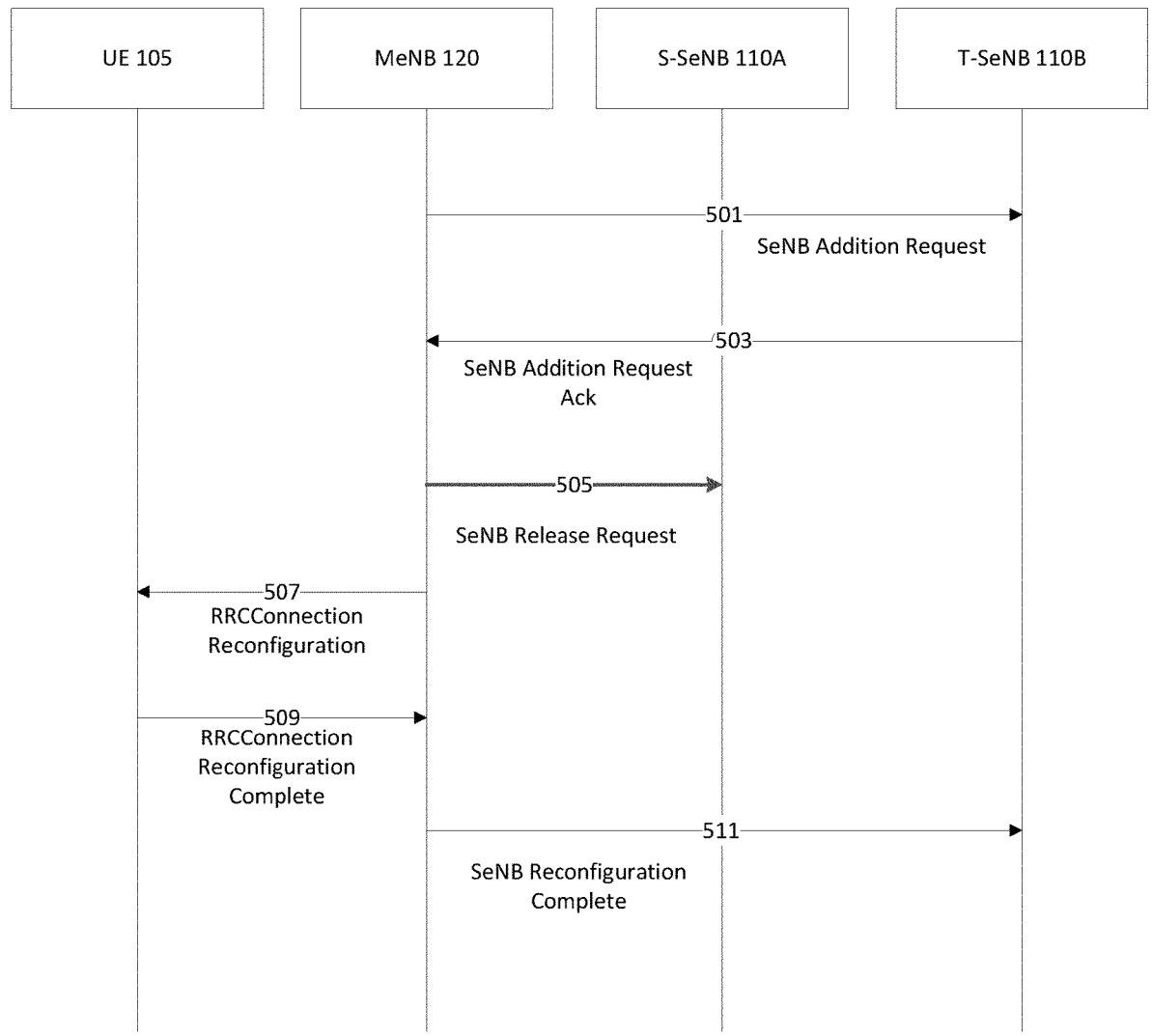
FIG. 5 illustrates a prior art signaling diagram.

FIG. 5 illustrates how a SeNB change procedure may be initiated by a MeNB 120 and used to transfer a UE context from a source SeNB 110A to a target SeNB 110B, as well as change the SCG configuration in the UE from the source SeNB 110A to the target SeNB 110B. As shown in FIG. 5, the LTE SeNB change procedure may be initiated by a MeNB 120 transmitting message 501, a SeNB Addition Request, towards a target SeNB 110B via the source SeNB 110A. In response, the target SeNB 110B may transmit message 503, a SeNB Addition Request Acknowledgement towards the MeNB 120 via the source SeNB 110A. The MeNB 120 may transmit message 505, a SeNB Release Request, to the source SeNB 110A, which the recipient SeNB 110A cannot reject. The MeNB 120 may then transmit message 507, a RRCConnectionReconfiguration message towards the UE 105, and in response receive message 509, a RRCConnectionReconfigurationComplete message from the UE 105. The MeNB 120 may further send message 511, a SeNB Reconfiguration Complete message towards the target SeNB 110B.

Secondary Node Configuration in Case of LTE-NR Interworking

In case of secondary node modification, or node change, or release procedures, the master node may not necessarily maintain the radio resource management, RRM, measurement configuration of the UE for the secondary node, but may only generate a final RRC message. The RRC message transmitted from the master node may contain the RRC PDU which is of an RRM measurement configuration prepared by the RRC entity in the secondary node. Whether the master node needs to understand the RRM measurement configuration or not may be left to the implementation.

In case of secondary node modification, node change, or release procedures, the RRM measurement report related to the mobility within the secondary node(s) may be received by the master node (RRC entity of the master node) a final RRC message. In a first option, the master node, without needing to parse the information, may transfer the NR part of the RRC message including the RRM measurement report, e.g., over X2* interface, to the secondary node (e.g. to the RRC entity located in the secondary node), e.g. by means of a container. In a second option, if a direct SRB is allowed between the secondary node and UE, the measurement report may be sent directly between the UE and the secondary node.

Figure 6:
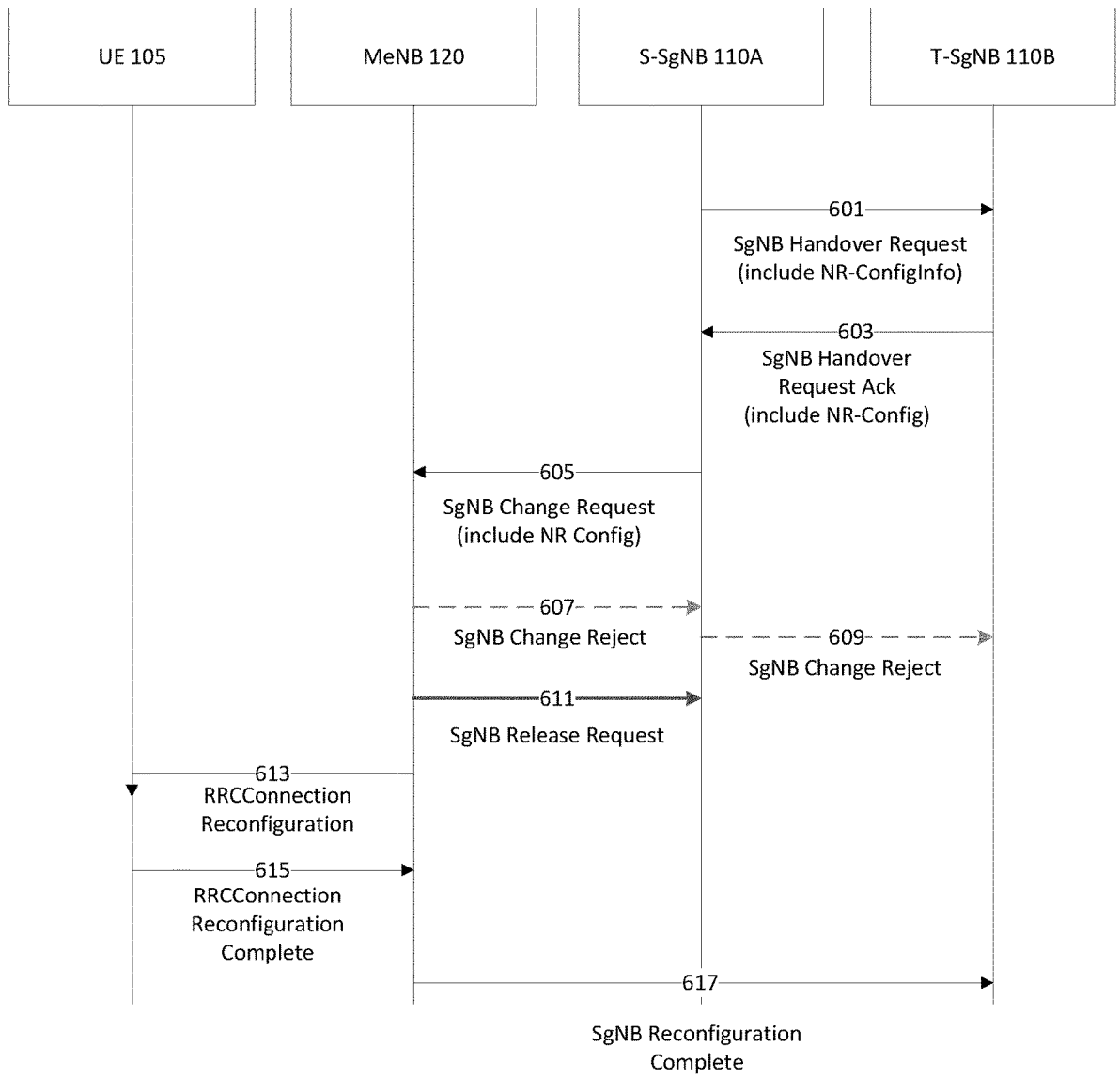
FIG. 6 illustrates a signaling diagram according to some embodiments.

FIGS. 5 and 6 show two options, e.g. called option A and option B, for the secondary node change and the reconfiguration of a new secondary node, wherein the RRC protocol of a secondary node is partially in charge of the secondary node change.

In both Options, different from LTE DC, secondary node change (SgNB) may be initiated by the secondary node (e.g. S-SgNB) instead of the master node (MeNB). As NR mobility is expected to be different from mobility in LTE, the mobility algorithms may cope with the beam based mobility.

In Option A, not all the secondary node (SgNB) change signaling has to go through the master node (MeNB), whereas in Option B, all the signaling relevant to secondary node (SgNB) change goes via the master node (MeNB), allowing it to understand all the signaling steps; it may depend on the implementation, how deep the master node shall understand the signalling. In either case, if the procedure is not intercepted by master node (MeNB), the target secondary node (e.g. T-SgNB), configuration info e.g., NR-Configuration Information (or briefly NR-Config Info), is sent to the UE via a final RRC message from MeNB.

Thus, target secondary node configuration info (T-SgNB NR-Config Info) may be (completely or partially) transparent to the MeNB that sends such configuration information to the UE in a final LTE RRC message.

LTE-NR Secondary Network Node Change

RRC diversity may be envisioned for both the downlink and uplink to address aforementioned challenges e.g. related to Ultra-Reliable and Low Latency Communications (URLLC) and mobility robustness.

NR RRM is expected to be different than LTE RRM due to above-discussed beam based mobility. Especially NR RRM measurement configuration, measurement reporting events and triggers may be rather different than those already specified for LTE mobility. It may e.g. be preferable keeping the LTE and NR RRMs self-contained, e.g. to enable a future-proof NR RRM design e.g., when NR stand-alone operation is considered.

Figure 7:
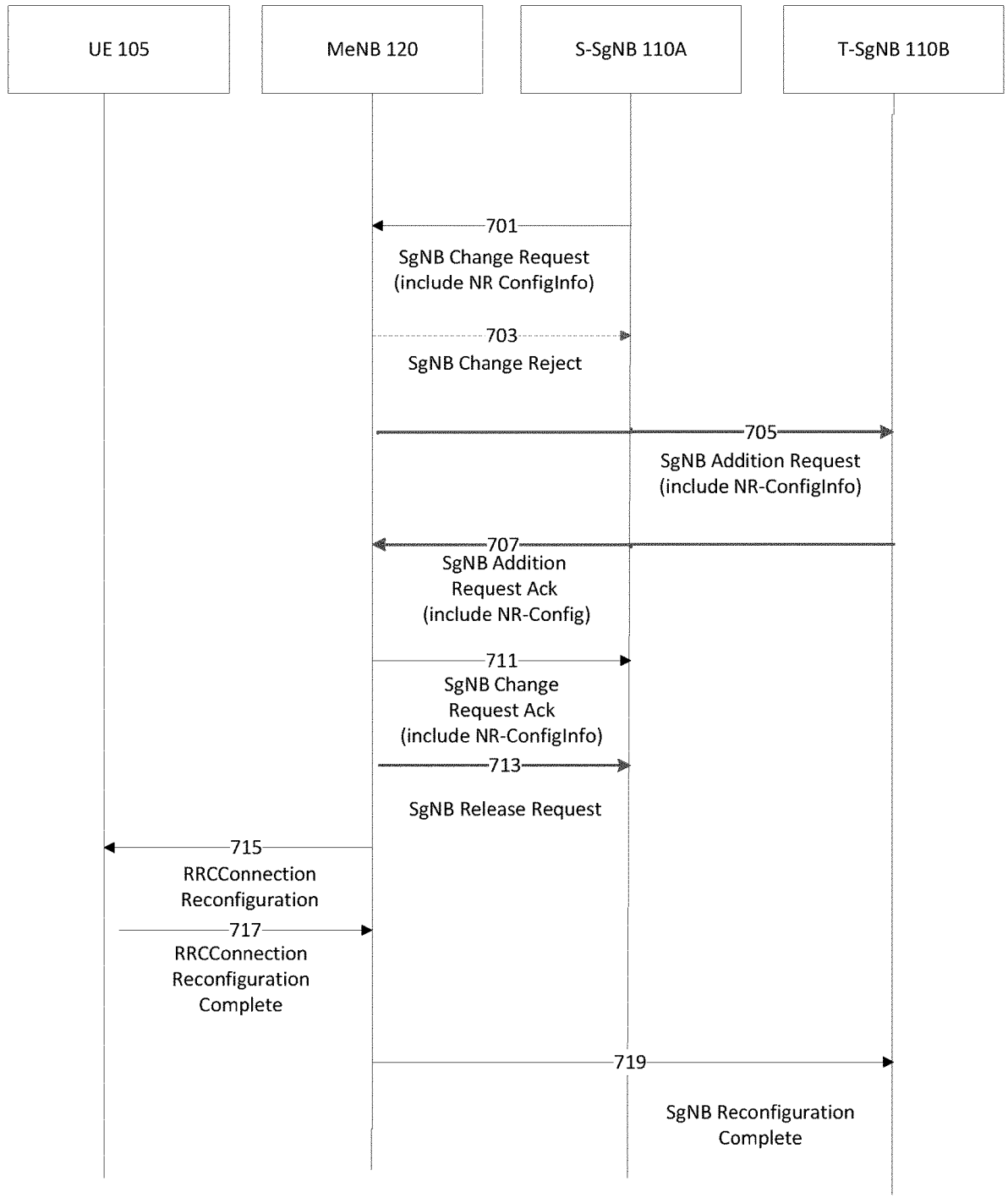
FIG. 7 illustrates a signaling diagram according to some embodiments.

In the following, it is described an exemplary set of embodiments related to the secondary network node change and the reconfiguration of a new secondary network node where the RRC protocol(s) of the source secondary network node and/or target secondary network node are partially in charge of the secondary network node change. Minimization of the specification of NR related mobility measurement configuration in LTE specifications and vice versa may be achieved by distributing mobility management/control between MeNB 120 and SgNB 110A-B (or MgNB 120 and SeNB 110A-B) in case of LTE-NR interworking The disclosure proposes two major options for the secondary network node change and the reconfiguration of a new secondary network node where the RRC protocol(s) of the source secondary network node and/or target secondary network node are partially in charge of the secondary network node change as shown in FIGS. 6-7. These options are different from LTE DC, as described above, because, for example, the SgNB Change is initiated by the S-SgNB 110A instead of the MeNB 120. Additionally, in both options, the target SgNB configuration may be transparent to the MeNB. It may be desirable for the SgNB change to be initiated by the S-SgNB 110A since NR mobility is expected to be different than LTE and the mobility algorithms may be beam based mobility. It may be expected that the entity deciding NR mobility may reside in the NR part of the 5G RAN, i.e., within a gNB, which may include knowledge about NR radio resource topology in the neighborhood, current NR radio resource status, and controlling and processing NR related UE measurements. The procedures described below proposes a solution where the LTE and NR related logical nodes of the 5G RAN are distinct, separate logical entities, inter-connected via an interface that is called "X2*."

First, the master network node 120, such as the MeNB 120 in FIG. 6, determines one or more suitable candidates to be the SgNB. This may be based on downlink (DL) measurements or uplink (UL) measurements.

In the case of a DL measurement based procedure, the SgNB determines the suitable measurement configuration for the UE including suitable inter-frequencies to measure. In addition, need of measurement gaps can be determined based on the UE capability. The SgNB constructs the measurement (RRC) configuration. The configuration is sent to the UE either directly or via MeNB. The first solution is only possible if the direct SRBs between SgNB and UE are supported. In the latter solution, MeNB sends the final RRC message to the UE. After the UE has measured potential candidates for new SgNB, the UE sends a measurement report to the network. This may be sent to the SgNB directly in case SRB between UE and SgNB is supported. If the measurement report is sent to the MeNB, the MeNB forwards the measurement results to the SgNB via X2 or X2*.

In the case of UL measurement based procedure, the decision to change SgNB may be performed in the original SgNB. The UE may be potentially configured with UL signal to be used for mobility. The signal may be similar to SRS. Depending on the solution, the UL signal configuration can be sent via RRC to the MeNB or SgNB directly. The SgNB can directly receive UL signal from the UE, and based on that determine suitable candidate(s) for the SgNB change. In cases where the MeNB receives the UL signal, the MeNB may forward the measurement result to the SgNB. Once the target SgNB is determined, the signaling to change the SgNB takes place as described below in connection with FIG. 6.

As shown in FIG. 6, the SgNB change is initiated by the S-SgNB 110A sending message 601, a SgNB Handover Request message, to T-SgNB 110B without passing it through the MeNB 120. NR-Config information included within the Handover Request 601 message may be used by the S-SgNB 110A to request the T-SeNB 110B to perform certain configuration actions, similar to those performed via LTE SCG-ConfigInfo and/or Handover Request in LTE. Next, the T-SgNB 110B replies back to the S-SgNB 110A with message 603, a SgNB Handover Response message including the NR configuration e.g., NR-Config. NR-Config may include the new radio resource associated with the T-SgNB 110B. The S-SgNB 110A then sends message 605 with the NR-Config information to MeNB 120. Message 605 may be an X2* AP message, called SgNB Change Request in FIG. 6, in order to enable the RRC reconfiguration of the UE 105 with the T-SgNB 110B. The same X2*AP message 605 may include information on the user plane switch so as to be able to successfully execute the SgNB change and activate user plane data flow toward UE 105. The NR configuration message (e.g., NR-Config), may be used to transfer the radio configuration generated by the T-SgNB 110B. Upon receiving the NR configuration via message 605, the MeNB 120 may (i) intercept, and send message 607, a SgNB change reject to the S-SgNB 110A, which in turn sends message 609, SgNB Change Reject to the T-SgNB 110B, or (ii) proceed by transmitting message 611, a SgNB Release Request, to the S-SgNB 110A. In the second case, the MeNB 120 may perform RRC Connection Reconfiguration steps, including transmitting message 613, a RRCConnectionReconfiguration message, to the UE 105, the UE 105 transmitting message 615, a RRCConnectionReconfigurationComplete message, to the MeNB 120, and the MeNB 120 transmitting message 617, a SgNB Reconfiguration Complete message, to the T-SgNB 110B to complete the SgNB transfer procedure.

FIG. 7 illustrates a second signaling diagram according to some embodiments. As shown in FIG. 7, the SgNB change procedure is initiated by the S-SgNB 110A, but the signaling goes via the MeNB 120. The S-SgNB 110A initiates the SgNB change procedure by transmitting message 701, a SgNB Change Request with NR Config Info message, to the MeNB 120. The MeNB 120 may then reject the SeNB change by transmitting message 703, a SgNB Change Reject message, or proceed with the change by transmitting message 705, a SgNB Addition Request (include NR-Config Info) message, towards the T-SgNB110B. In the latter case, the T-SgNB 110B may respond to message 705 by transmitting towards the MeNB 120 message 707, a SgNB Addition Request Acknowledgement message, which includes the NR-Config Info for the T-SgNB 110B. In response to message 707, the MeNB 120 may transmit message 711, a SgNB Change Request Acknowledgement (include NR-Config Info) to the S-SgNB 110A, as well as transmit message 713, a SgNB Release Request message, to the S-SgNB 110A. The MeNB 120 may perform RRC Connection Reconfiguration steps, including transmitting message 715, a RRCConnectionReconfiguration message, to the UE 105, the UE 105 transmitting message 717, a RRCConnectionReconfigurationComplete message, to the MeNB 120, and the MeNB 120 transmitting message 719, a SgNB Reconfiguration Complete message, to the T-SgNB 110B to complete the SgNB transfer procedure.

Depending on the implementation and which messages the MeNB 120 can partially or fully understand e.g., SgNB Change Request or SgNB Addition Request Acknowledge, the MeNB 120 may intercept the procedure e.g., proceed with/reject the SeNB change earlier as shown in FIG. 7 as compared to the other option as shown in FIG. 6. However, in some embodiments, the procedure shown in FIG. 6 may be more desirable where forcing each signal to go through MeNB 120 may increase signaling overhead and latency for the SgNB change procedure. On the other hand, it may also be advantageous to allow a central entity to overlook the overall mobility behavior and respective RRM strategy due to, for example, the fact that mobility of the RRC connection that is controlled by the MeNB needs to be taken into account. Apart from that, the second option shown in FIG. 7 would be able to reuse existing LTE framework.

In some embodiments, the NR configuration message, e.g., NR-Config Info in messages 603, 706, may be an RRC Protocol Data Unit (PDU) transferred between UE RRC entity and NR RRC entity. Yet in another embodiment, such information could be comprised by an information element (IE) similar to SCG-Config in LTE DC.

In another option/embodiment, the LTE-NR interworking scenario as shown in FIGS. 6-7 could be other way around such, that a NR node is the master network node 120 (i.e., MgNB 120), and LTE nodes are the source and target secondary network nodes (i.e., S-SeNB 110A and T-SeNB 110B and/or S-SgNB and T-SgNB). In some embodiments, the configuration may be transferred directly from the S-SgNB to the UE instead of transferring it via the MeNB. In another embodiment, the involved 5G RAN nodes could be nodes that support both LTE and NR access, hence, each entity could be in the position to comprehend and process RRC messages and perform respective RRM actions. Yet, in another embodiment, the scenario could be the same as shown in FIGS. 6-7, and MeNB 120 can in parallel add an SgNB or change an SgNB by following the existing LTE DC procedures, as can be found in 3GPP TS 36.300.

Figure 8:
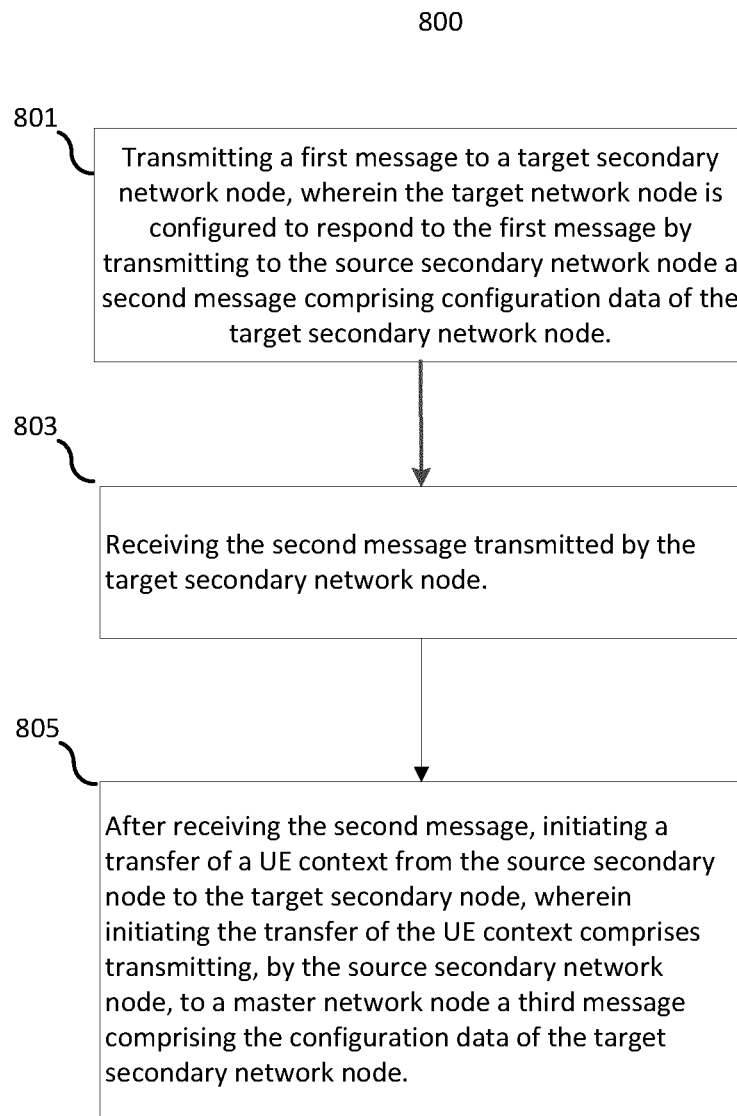
FIG. 8 illustrates an exemplary flow chart according to some embodiments.

FIG. 8 is an exemplary flow diagram according to some embodiments. In preferred embodiments, method 800 is performed by the source secondary network node 110A as described in connection with FIG. 10 to transfer a UE context from the source secondary network node 110A to a target secondary network node 110B that is different than the source secondary network node 110B.

In step 801, the source secondary network node 110A transmits a first message to the target secondary network node 110B, wherein the target network node 110B is configured to respond to the first message by transmitting to the source secondary network node 110A a second message comprising configuration data of the target secondary network node 110B.

In step 803, the source secondary network node 110A receives the second message transmitted by the target secondary network node 110B.

In step 805, after receiving the second message, the source secondary network node 110A initiates a transfer of the UE context from the source secondary network node 110A to the target secondary network node 110B, wherein initiating the transfer of the UE context comprises the source secondary network node 110A transmitting to a master network node 120 a third message comprising the configuration data of the target secondary network node.

In some embodiments, the first message in step 801 may comprise a Handover Request message 601 as shown in FIG. 6, the Handover Request message instructing the target secondary network node 110B to perform one or more configuration actions. In some embodiments, the second message in steps 801 and 803 of method 800 may comprise a Handover Response message, such as the Handover Request Ack message 603 as shown in FIG. 6. In some embodiments, the configuration data in the second message may comprise NR-Config Info, which may be one of a RRC PDU or an IE. In some embodiments, the source secondary network node 110B may receive a fourth message transmitted by the master network node 120 in response to the master network node 120 receiving the third message. The fourth message may be a Release Request, such as message 611 shown in FIG. 6.

Figure 9:
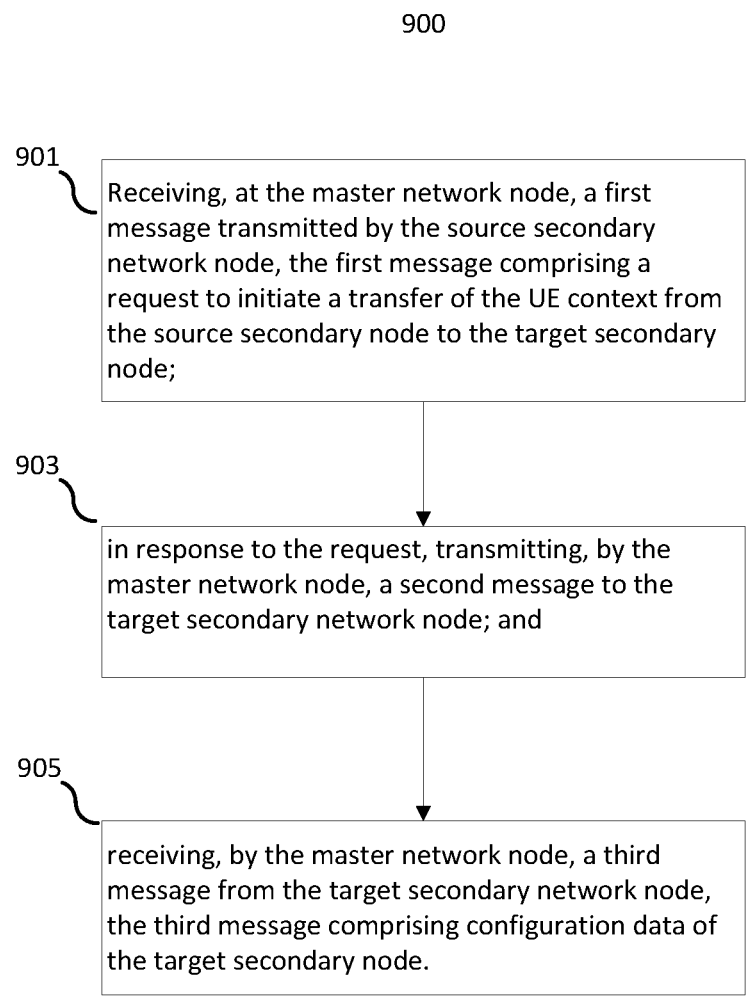
FIG. 9 illustrates an exemplary flow chart according to some embodiments.

FIG. 9 is an exemplary flow diagram according to some embodiments. In preferred embodiments, method 900 is performed by the master network node 120 as described below in connection with FIG. 11.

In step 901, the master network node 120 receives a first message transmitted by the source secondary network node 110A, the first message comprising a request to initiate a transfer of the UE context from the source secondary network node 110A to the target secondary network node 110B. In some embodiments, the first message may comprise a Change Request, such as message 701 as shown in FIG. 7.

In step 903, in response to the request, the master network node 120 transmits a second message to the target secondary network node 110B.

In step 905, the master network node 120 receives a third message from the target secondary network node 110B, the third message comprising configuration data of the target secondary network node 110B. In some embodiments, the configuration data of the target secondary network node 110B may comprise NR-Config Info, which may comprise one of a RRC PDU or an IE.

In some embodiments, method 900 may further comprise the master network node 120 transmitting an acknowledgement of the request to the secondary network node 110A, such as message 711 shown in FIG. 7. In some embodiments, method 900 may further comprise the master network node 120 transmitting a release request to the source secondary network node 110A, such as message 713 shown in FIG. 7. In some embodiments, method 900 may further comprise the master network node 120 transmitting a message to the UE 105 in response to receiving the third message, the message comprising an RRC Connection Reconfiguration, (RRCConnectionReconfiguration) message such as message 715 shown in FIG. 7. The method 900 may further comprise the master network node 120 receiving a message from the UE 105, the message comprising an RRC Connection Reconfiguration Complete (RRCConnectionReconfiguration Complete) message such as message 717 shown in FIG. 7. In some embodiments, the method 900 may further comprise the master network node 120 transmitting to the target secondary network node 110B a Reconfiguration Complete message, such as message 719 shown in FIG. 7.

In connection with FIGS. 8-9, in some embodiments, the source secondary network node 110A comprises a first New Radio Node, the target secondary network node 110B comprises a second New Radio Node, and the master network 120 node comprises an eNB. In other embodiments, the source secondary network node 110A comprises a first eNB, the target secondary network node 110B comprises a second eNB, and the master network node 120 comprises a New Radio Node.

Figure 10:
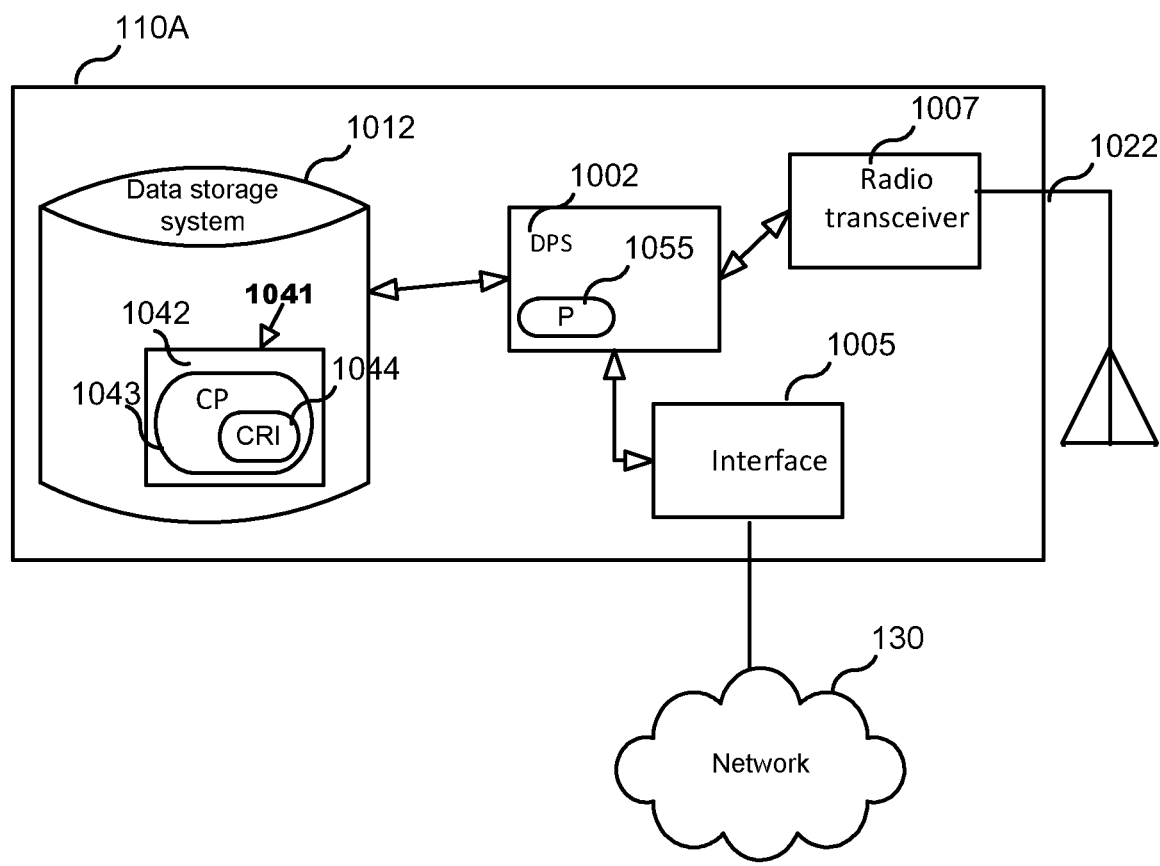
FIG. 10 is a block diagram of a secondary network node according to some embodiments.

FIG. 10 is a block diagram of a source secondary network node 110A according to some embodiments. As shown in FIG. 10, source secondary network node 110A may comprise: a data processing system (DPS) 1002, which may include one or more processors 1055 (e.g., a general purpose microprocessor and/or one or more other data processing circuits, such as an application specific integrated circuit (ASIC), field-programmable gate arrays (FPGAs), and the like); a network interface 1005 for use in connecting source secondary network node 110A to network 130; a radio transceiver 1007 (i.e., a receiver and a transmitter) coupled to an antenna 1022 for use in, for example, wirelessly communicating with UEs and other devices; and local storage unit (a.k.a., "data storage system") 1012, which may include one or more non-volatile storage devices and/or one or more volatile storage devices (e.g., random access memory (RAM)). In embodiments where source secondary network node 110A includes a general-purpose microprocessor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, but not limited, to magnetic media (e.g., a hard disk), optical media (e.g., a DVD), memory devices (e.g., random access memory), and the like. In some embodiments, the CRI 1044 of computer program 1043 is configured such that when executed by data processing system 1002, the CRI causes the source secondary network node 110A to perform steps described above (e.g., steps described above with reference to the flow charts). In other embodiments, secondary network node 110A may be configured to perform steps described herein without the need for code. That is, for example, data processing system 1002 may consist merely of one or more ASICs. Hence, the features of the embodiments described herein may be implemented in hardware and/or software.

Figure 11:
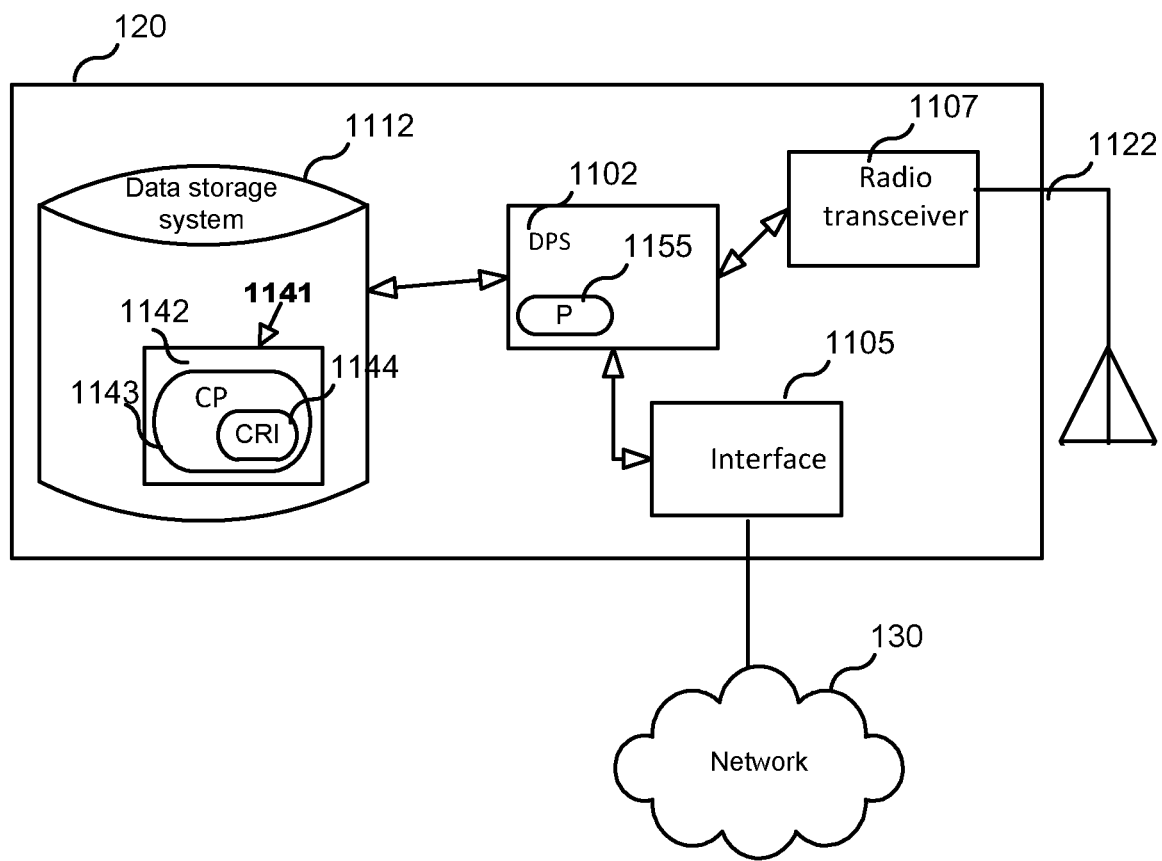
FIG. 11 is a block diagram of a master network node according to some embodiments.

FIG. 11 is a block diagram of a master network node 120 according to some embodiments. As shown in FIG. 11, master network node 120 may comprise: a data processing system (DPS) 1102, which may include one or more processors 1155 (e.g., a general purpose microprocessor and/or one or more other data processing circuits, such as an application specific integrated circuit (ASIC), field-programmable gate arrays (FPGAs), and the like); a network interface 1105 for use in connecting master network node 120 to network 130; a radio transceiver 1107 coupled to an antenna 1122 for use in, for example, wirelessly communicating with UEs and other devices; and local storage unit (a.k.a., "data storage system") 1112, which may include one or more non-volatile storage devices and/or one or more volatile storage devices (e.g., random access memory (RAM)). In embodiments where master network node 120 includes a general purpose microprocessor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited, to magnetic media (e.g., a hard disk), optical media (e.g., a DVD), memory devices (e.g., random access memory), and the like. In some embodiments, the CRI 1144 of computer program 1143 is configured such that when executed by data processing system 1102, the CRI causes the master network node 120 to perform steps described above (e.g., steps described above with reference to the flow charts). In other embodiments, master network node 120 may be configured to perform steps described herein without the need for code. That is, for example, data processing system 1102 may consist merely of one or more ASICs. Hence, the features of the embodiments described herein may be implemented in hardware and/or software.

In the following various embodiments will be exemplarily described.

Secondary Network Node Embodiments

E1. A method performed by a source secondary network node to transfer a User Equipment context from the source secondary network node to a target secondary network node that is different than the source secondary network node, the method comprising:

transmitting, by the source secondary network node, a first message to the target secondary network node, wherein the target network node is configured to respond to the first message by transmitting to the source secondary network node a second message comprising configuration data of the target secondary network node;

receiving, at the source secondary network node, the second message transmitted by the target secondary network node; and after receiving the second message, initiating a transfer of the UE context from the source secondary network node to the target secondary network node, wherein initiating the transfer of the UE context comprises transmitting, by the source secondary network node, to a master network node a third message comprising the configuration data of the target secondary network node.

E2. The method of embodiment 1, wherein the first message comprises a Handover Request message, the Handover Request message instructing the target secondary network node to perform one or more configuration actions.

E3. The method of embodiment 2, wherein the second message comprises a Handover Response message.

E4. The method of any one of embodiments 1-2, wherein the configuration data comprises one of: a radio resource control (RRC) protocol data unit (PDU) or an information element (IE).

E5. The method of any one of embodiments 1-4, further comprising:

receiving, at the source secondary network node, a fourth message transmitted by the master network node, the fourth message comprising a Release Request, wherein the master network node is configured to transmit the fourth message after receiving the third message.

E6. The method of any one of embodiments 1-5, wherein the source secondary network node comprises a first New Radio Node, the target secondary network node comprises a second New Radio Node, and the master network node comprises an Evolved Node B.

E7. The method of any one of embodiments 1-5, wherein the source secondary network node comprises a first Evolved Node B, the target secondary network node comprises a second Evolved Node B, and the master network node comprises a New Radio Node.

E8. A source secondary network node, comprising a transmitter; a receiver; a memory; and a data processing system comprising one or more processors, wherein the source secondary network node is configured to perform the method of any one of embodiments 1-7.

Master Network Node Embodiments

E1. A method performed by a master network node to transfer a User Equipment context from a source secondary network node to a target secondary network node that is different than the source secondary network node, the method comprising:

receiving, at the master network node, a first message transmitted by the source secondary network node, the first message comprising a request to initiate a transfer of the UE context from the source secondary network node to the target secondary network node;

in response to the request, transmitting, by the master network node, a second message to the target secondary network node; and receiving, by the master network node, a third message from the target secondary network node, the third message comprising configuration data of the target secondary network node.

E2. The method of embodiment 1, further comprising:

transmitting, by the master network node, a fourth message to the source secondary network node, the fourth message comprising an acknowledgement of the request.

E3. The method of embodiment 2, further comprising:

transmitting, by the master network node, a fifth message to the source secondary network node, the fifth message comprising a Release Request.

E4. The method of any one of embodiments 1-3, further comprising:

in response to receiving the third message, transmitting a sixth message to the User Equipment, the sixth message comprising a RRCConnectionReconfiguration message; and receiving a seventh message from the User Equipment, the seventh message comprising a RRCConnectionReconfiguration Complete message.

E5. The method of embodiment 4, further comprising:

in response to receiving the seventh message, transmitting, to the target secondary network node, an eighth message, the eighth message comprising a Reconfiguration Complete.

E6. The method of any one of embodiments 1-5, wherein the first message comprises a Change Request.

E7. The method of any one of embodiments 1-6, wherein the configuration data of the target secondary network node comprises one of: a radio resource control (RRC) protocol data unit (PDU) or an information element.

E8. The method of any one of embodiments 1-7, wherein the source secondary network node comprises a first New Radio Node, the target secondary network node comprises a second New Radio Node, and the master network node comprises an Evolved Node B.

E9. The method of any one of embodiments 1-7, wherein the source secondary network node comprises a first Evolved Node B, the target secondary network node comprises a second Evolved Node B, and the master network node comprises a New Radio Node.

E10. A master network node, comprising: a transmitter; a receiver; a memory; and a data processing system comprising one or more processors, wherein the master network node is configured to perform the method of any one of embodiments 1-9.

While various embodiments of the present disclosure are described herein, it should be understood that they have been presented by way of example only. Additionally, while the processes described above and illustrated in the drawings are shown as a sequence of steps, this was done solely for the sake of illustration. Accordingly, it is contemplated that some steps may be added, some steps may be omitted, the order of some steps may be re-arranged, and some steps may be performed in parallel.

The invention claimed is:

1. A method, implemented by a source secondary network node of a wireless network, the method comprising:

serving a radio link to a User Equipment (UE) concurrently with a further radio link that is served to the UE by a master network node;

transmitting, to a target secondary network node that is different than the source secondary network node, a first message comprising a handover request, the handover request requesting transfer of a context of the UE from the source secondary node to the target secondary node;

responsive to the handover request, receiving a second message comprising configuration data of the target secondary network node, the configuration data comprising a Radio Resource Control protocol data unit;

after receiving the second message, transmitting, to the master network node providing the further radio link to the UE, a third message comprising the configuration data of the target secondary network node;

responsive to the third message, transferring or refraining from transferring the context of the UE to the target secondary node in accordance with an instruction from the master network node;

wherein the source secondary network node and target secondary network node respectively comprise New Radio nodes, and the master network node comprises an Evolved Node B.

2. The method of claim 1, wherein the first message comprising the handover request is indicative of instructions to perform one or more configuration actions.

3. The method of claim 2, wherein the second message comprises a handover response message.

4. The method of claim 1, further comprising receiving, at the source secondary network node, a fourth message transmitted by the master network node, the fourth message comprising a release request.

5. A source secondary network node of a wireless network, the source secondary network node comprising:

processing circuitry;

memory containing instructions executable by the processing circuitry whereby the network node is operative to:

serve a radio link to a User Equipment (UE) concurrently with a further radio link that is served to the UE by a master network node;

transmit, to a target secondary network node that is different than the source secondary network node, a first message comprising a handover request, the handover request requesting transfer of a context of the UE from the source secondary node to the target secondary network node;

responsive to the handover request, receive a second message comprising configuration data of the target secondary network node, the configuration data comprising a Radio Resource Control protocol data unit;

after receiving the second message, transmit, to the master network node providing the further radio link to the UE, a third message comprising the configuration data of the target secondary network node;

responsive to the third message, transfer or refrain from transferring the context of the UE to the target secondary node in accordance with an instruction from the master network node;

wherein the source secondary network node and target secondary network node respectively comprise New Radio nodes, and the master network node comprises an Evolved Node B.

6. The network node of claim 5, wherein the first message comprising the handover request is indicative of instructions to perform one or more configuration actions.

7. The network node of claim 5, wherein the second message comprises a handover response message.

8. The network node of claim 5, wherein the instructions are such that the network node is operative to receive a fourth message from the master network node, the fourth message comprising a release request.

9. A method performed by a master network node, the method comprising:
serving a further radio link to a User Equipment (UE) concurrently with a radio link that is served to the UE by a source secondary network node;
receiving a first message transmitted by the source secondary network node, the first message comprising a request to initiate a transfer of a context of the UE from the source secondary network node to a target secondary network node that is different than the source secondary network node;
in response to the request, transmitting a second message to the target secondary network node; and
after transmitting the second message, receiving a third message from the target secondary network node, the third message comprising configuration data of the target secondary network node, the configuration data comprising a Radio Resource Control protocol data unit;
responsive to the third message, transmitting, to the source secondary node, an instruction to transfer or refrain from transferring the context of the UE to the target source secondary node;
wherein the source secondary network node and target secondary network node respectively comprise New Radio nodes, and the master network node comprises an Evolved Node B.

10. The method of claim 9, further comprising transmitting a fourth message to the source secondary network node, the fourth message comprising an acknowledgement of the request.

11. The method of claim 10, further comprising transmitting a fifth message to the source secondary network node, the fifth message comprising a release request.

12. The method of claim 9, further comprising:
in response to receiving the third message, transmitting a sixth message to the User Equipment, the sixth message comprising a Radio Resource Control (RRC) connection reconfiguration message; and
receiving a seventh message from the User Equipment, the seventh message comprising a RRC connection reconfiguration complete message.

13. The method of claim 12, further comprising in response to receiving the seventh message, transmitting, to the target secondary network node, an eighth message, the eights message comprising a reconfiguration complete message.

14. The method of claim 9, wherein the first message comprises a change request.

15. A master network node, comprising:
processing circuitry;
memory containing instructions executable by the processing circuitry whereby the master network node is operative to:
serve a further radio link to a User Equipment (UE) concurrently with a radio link that is served to the UE by a source secondary network node;
receive a first message transmitted by the source secondary network node, the first message comprising a request to initiate a transfer of a context of the UE from the source secondary network node to a target secondary network node that is different than the source secondary network node;
in response to the request, transmit a second message to the target secondary network node; and
after transmitting the second message, receive a third message from the target secondary network node, the third message comprising configuration data of the target secondary network node, the configuration data comprising a Radio Resource Control protocol data unit;
responsive to the third message, transmit, to the source secondary node, an instruction to transfer or refrain from transferring the context of the UE to the target source secondary node;
wherein the source secondary network node and target secondary network node respectively comprise New Radio nodes, and the master network node comprises an Evolved Node B.

16. The network node of claim 15, wherein the instructions are such that the master network node is operative to transmit a fourth message to the source secondary network node, the fourth message comprising an acknowledgement of the request.

17. The network node of claim 15, wherein the instructions are such that the master network node is operative to transmit a fifth message to the source secondary network node, the fifth message comprising a release request.

18. The network node of claim 15, wherein the instructions are such that the master network node is operative to:
transmit, in response to the third message, a sixth message to the User Equipment, the sixth message comprising a Radio Resource Control (RRC) connection reconfiguration message; and
receive a seventh message from the User Equipment, the seventh message comprising a RRC connection reconfiguration complete message.

19. The network node of claim 18, wherein the instructions are such that the master network node is operative to transmit, in response to the seventh message, an eighth message to the target secondary network node, the eighth message comprising a reconfiguration complete message.

20. The network node of claim 15, wherein the first message comprises a change request.

* * * * *